April 1, 1958 J. ENSINK 2,829,283
CIRCUIT ARRANGEMENT FOR SUPPLYING A SINUSOIDAL OSCILLATION TO A LOAD
Filed March 4, 1955
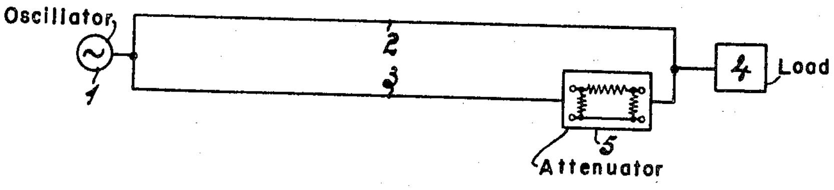
INVENTOR
JOHANNES ENSINK
BY Fred M. Vogel
AGENT

United States Patent Office 2,829,283

Patented Apr. 1, 1958

2,829,283

CIRCUIT ARRANGEMENT FOR SUPPLYING A SINUSOIDAL OSCILLATION TO A LOAD

Johannes Ensink, Hilversum, Netherlands, assignor, by mesne assignments, to North American Philips Company, Inc., New York, N. Y., a corporation of Delaware Application March 4, 1955, Serial No. 492,257

Claims priority, application Netherlands March 24, 1954

2 Claims. (Cl. 307—148)

The present invention relates to a circuit arrangement for supplying a load. More particularly, the invention relates to a circuit arrangement for supplying a sinusoidal oscillation through a first transmission path to a load and for supplying a sinusoidal oscillation having the same or substantially the same frequency to the same load through a second transmission path.

In carrier-wave telephone technique it is often desirable to transmit a sinusoidal oscillation of a particular frequency produced in a station of a telephone communication system to a next following station.

If between these two stations two transmission paths are available, it is advantageous with respect to the operational safety of the transmission to utilize also the second transmission path, since in the event of disturbance of one of the transmission paths an oscillation is nevertheless transmitted.

There is, however, a serious limitation. Even if the two transmission paths are identical or substantially identical, it may occur that, for example due to different temperature conditions or other operational conditions, the oscillations do not reach the load in the same phase along the two different paths. If the oscillations arrive at the input of the load in phase opposition, the amplitude may even fall to zero.

It is known that in carrier-wave technique the carrier waves for the various channels are usually obtained from the harmonics of a master oscillator.

Since in the event of a disturbance of this master oscillator, all channels of the carrier-wave telephone communication system would be disturbed, provision is usually made of a spare master oscillator, which takes over the function of the master oscillator in the event of such a disturbance.

It has been suggested to couple the master oscillator and the spare master oscillator through parallel transmission paths with the load, in this case the further carrier-wave terminal apparatus. If, however, a small frequency difference or phase difference prevails, or is produced, between the oscillations produced by the two oscillators and is then transmitted, the aforesaid limitation occurs in that the amplitude of the oscillation finally supplied to the load exhibits large variations in value.

The circuit arrangement according to the invention mitigates this disadvantage and has the feature that the ratio of the amplitudes of the two oscillations at the input of the load is substantially 2.

If the amplitude of the stronger oscillation is assumed to be 2 and that of the weaker is assumed to be 1, the amplitude of the oscillation occurring at the input of the load is 3 at a maximum, if the two oscillations are in phase, and 1 at a minimum, if the oscillations are in phase opposition. The resultant amplitude can, consequently, never become zero. If desired, the load may be provided with a limiter, or preferably with an amplifier having an automatic gain control, so that the amplitude variation may be reduced.

In order that the invention may be readily carried into effect, it will now be described with reference to the accompanying drawing, wherein the single figure is a schematic diagram of an embodiment of the circuit arrangement of the present invention.

The oscillation produced by an oscillator 1 is supplied through two parallel transmission paths 2 and 3 to a load 4. The transmission path 3 includes an attenuator 5, which is adjusted in a manner such that the amplitude of the oscillation transmitted through the path 2 is, at the input of the load 4, substantially twice the amplitude of the oscillation supplied through the path 3, 5 to the load 4.

While the invention has been described by means of a specific example and in a specific embodiment, I do not wish to be limited thereto, for obvious modifications will occur to those skilled in the art without departing from the spirit and scope of the invention.

What is claimed is:

1. A circuit arrangement for supplying a sinusoidal oscillation to a load comprising a pair of transmission lines, means for supplying a sinusoidal oscillation through one of said lines to said load and for supplying a sinusoidal oscillation of substantially the same frequency through the other of said lines to said load, and means interposed in one of said lines for adjusting the ratio of the amplitudes of said oscillations at substantially two at the input to said load.

2. A circuit arrangement as claimed in claim 1, wherein said adjusting means comprises an attenuator system contained in one of said transmission lines.

No references cited.